(12) United States Patent
Tekinay

(10) Patent No.: US 6,175,811 B1
(45) Date of Patent: *Jan. 16, 2001

(54) METHOD FOR FREQUENCY ENVIRONMENT MODELING AND CHARACTERIZATION

(75) Inventor: Sirin Tekinay, Morristown, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/984,779

(22) Filed: Dec. 4, 1997

(51) Int. Cl.⁷ .................................................. G01S 1/00
(52) U.S. Cl. ................................... 702/71; 333/142
(58) Field of Search ......................... 702/71; 333/142, 333/145; 361/818, 618; 395/500.23

(56) References Cited

U.S. PATENT DOCUMENTS

| | | | |
|---|---|---|---|
| 3,869,673 | 3/1975 | Close | 325/393 |
| 5,029,475 | * 7/1991 | Kikuchi et al. | 73/602 |
| 5,166,694 | 11/1992 | Russell et al. | 342/457 |
| 5,257,265 | * 10/1993 | Su et al. | 370/100.1 |
| 5,266,953 | 11/1993 | Kelly et al. | 342/47 |
| 5,317,323 | 5/1994 | Kennedy et al. | 342/457 |
| 5,327,144 | 7/1994 | Stilp et al. | 342/387 |
| 5,402,450 | 3/1995 | Lennen | 375/343 |
| 5,450,615 | 9/1995 | Fortune et al. | 455/67.6 |
| 5,486,833 | 1/1996 | Barrett | 342/204 |
| 5,512,908 | 4/1996 | Herrick | 342/387 |
| 5,542,101 | 7/1996 | Pal | 455/65 |
| 5,548,296 | 8/1996 | Matsuno | 342/457 |
| 5,561,841 | 10/1996 | Markus | 455/33.1 |
| 5,574,466 | * 11/1996 | Reed et al. | 342/359 |
| 5,612,700 | 3/1997 | Tucker | 342/90 |
| 5,630,208 | 5/1997 | Enge et al. | 455/65 |
| 5,669,063 | 9/1997 | Brockel et al. | 455/506 |
| 5,692,008 | 11/1997 | Van Nee | 375/208 |
| 5,710,977 | 1/1998 | Nakazawa | 455/65 |
| 5,742,635 | 4/1998 | Sanderford, Jr. | 375/200 |
| 5,764,686 | 6/1998 | Sanderford et al. | 375/200 |
| 5,901,183 | 5/1999 | Garin et al. | 375/303 |
| 5,918,161 | 6/1999 | Kumar et al. | 455/65 |
| 6,009,334 | 12/1999 | Grubeck et al. | 455/456 |

OTHER PUBLICATIONS

A. Bruce, D. Donoho and H.Y. Goo, "Wavelet Analysis," *IEEE Spectrum*, Oct. 1996, pp. 26–35.

A.P. Pentland, "Fractal–Based Description Of Natural Scenes," *IEEE Transactions On Pattern Analysis And Machine Intelligence*, vol. PAMI–6, No. 6, Nov. 1984, pp. 661–674.

J. Brooks Chadwick and J.L. Bricker, "A Vehicle Location System Solution Approach," *IEEE Position Location And Navigation Symposium*, 1990, pp. 127–132.

(List continued on next page.)

*Primary Examiner*—Kenneth B. Wells
*Assistant Examiner*—Linh Nguyen

(57) ABSTRACT

The present invention provides an RF model that characterizes the scattering hostility in an RF environment through a set of parameters. The parameters essentially provide a description of the amount of multipath that an RF signal would incur if it were to travel in the RF environment. Thus, such an RF model can be used to predict the amount of signal degradation that a given RF signal would experience when transmitted from any point in the RF environment. As a result, the RF model can be used to determine whether a given RF signal, if transmitted from a given point in an RF environment, could be received by a receiver located at another point in the RF environment. Advantageously, the RF model can characterize the scattering hostility in an RF environment without being programmed with volumes of environmental information.

10 Claims, 4 Drawing Sheets

OTHER PUBLICATIONS

See, C. et al., "Estimating Directions and Times of Arrival of Mutipath Signals Using a Calibrated Space–time Antenna Array"Statistical Signal and Array Processing, Jun.1998. Proceedings., Ninth IEEE SP Workshop on 1998, pp. 364–367.

Hashemi, Homayoun. "Pulse Ranging Radiolocation Technique and Its Application to Channel Assignment in Digital Cellular Radio,"Vehicular Technology conf. pp. 675–680. Jul. 1991.

Fischer, Sven et al, "Time of arrival estimation of narrowband TDMA for mobile positioning "Personal, Indoor and Mobile Radio Communications, 1998. The Ninth IEEE International Symposium on. vol. 1, Sep.1998, pp. 451–455.

Pahlavan, Kaven et al., "Wideband Radio Propagation Modeling for Indoor Geolocation Applications"IEEE Communications Magazine 0163–680 pp. 60–65, Apr. 1998

Spencer, Quentin et al."Indoor Wideband Time/Angle of Arrival Multipath Propagation Results", Vehicular Technology Conference, 1997, IEEE 47th, vol. 3,Mar. 1998, pp. 1410–1444.

Askew, Robert e. et al. "Suppression of Multipath and Other Interferes Using Electronically Variable Time Delay Elements"Telesystems Conference, 1994. Conference Proceedings ., 1994 IEEE National,Sep. 1998, pp. 91–94.

Chua, Peng–Hunt et al. Vector–Sensor Array Processing For Estimating Angels and Times of Arrival of Multipath Communication Signals: Acoustics, Speech and Signal Processing, 1998. Proceedings of the 1998 IEEE International Conference on, Jun. 1998, pp. 3325–3328.

* cited by examiner

METHOD FOR FREQUENCY ENVIRONMENT MODELING AND CHARACTERIZATION

RELATED APPLICATIONS

This invention is related to the inventions disclosed in the applicant's application Ser. No. 08/985,133, entitled "Detecting the Geographical Location Of Wireless Units," filed on Dec. 4, 1997; Ser. No. 08/984,728, entitled "Method For Improved Line-Of-Sight Signal Detection Using Time/Frequency Analysis," filed on Dec. 4, 1997; and Serial No. 08/984,780, entitled "Method For Improved Line-Of-Sight Signal Detection Using RF Model Parameters," filed on Dec. 4, 1997.

FIELD OF THE INVENTION

The present invention relates to the field of radio communications and, more particularly, to a method of modeling a radio frequency environment.

BACKGROUND OF THE INVENTION

Designers of wireless communication systems presently use radio frequency (RF) models as tools to aid in their designing effort. An RF model is basically a mathematical simulation or characterization of some aspect or function of an RF communication system. Once formed, an RF model can be used to test the operation of the system that it models before having to incur the expense of building the system itself.

RF models have been used to test the behavior of RF signals traveling in an RF environment in which a communications system provides service. Such tests are designed to help determine whether scattering in the RF environment may cause the RF signal to degrade to the point that the RF signal can not be detected and/or decoded by receivers operating in the communications system. The term scattering refers to the phenomenon wherein an RF signal, traveling in an RF environment, hits and reflects off structures in the RF environment, thereby causing the RF signal to take random paths through the environment. The propensity of an RF environment to scatter signals is hereinafter referred to as "scattering hostility." Depending on the scattering hostility in an RF environment, an RF signal may multipath (i.e. simultaneously travel different paths between two points) as it travels in the RF environment.

By causing a signal to multipath, scattering can be problematic to maintaining reliable communications in a wireless system. To illustrate, an RF signal transmitted from a wireless terminal, such as a cell phone, actually propagates in all directions from the wireless terminal's antenna. A signal propagating in a first direction from the antenna may reflect off the side of a building and thereafter travel in a new direction in the RF environment. The same signal propagating in a second direction from the antenna of the wireless terminal may, however, travel in the RF environment without being reflected. When this happens, the non-reflected and the reflected signals may ultimately travel from the transmitting antenna to the same receiving antenna, but through different paths in the RF environment. As a result, they will typically be received by the receiver at different times. Thus, an incoming signal (to the receiver) can actually be composed of at least two so-called multipath components of the transmitted signal.

Depending on the characteristics of the multipath components of an incoming signal, a wireless communications system may have great difficulty performing certain functions. For example, the characteristics of the multipath components may cause some conventional geolocation systems to incorrectly determine the geolocation of a wireless terminal communicating with the system. The term geolocation as used herein refers to the point in two- or three-dimensional space defined by a set of coordinates, e.g. longitude and latitude, and/or defined by a vector, i.e. distance and direction, from a known point in space. To determine the geolocation of the wireless terminal, such geolocation systems must determine the time-of-arrival of the line-of-sight component of a signal transmitted by the wireless terminal.

To determine the time-of-arrival of the line-of-sight component of the incoming signal, such conventional geolocation systems assume that the first-arriving component of the incoming signal is the line-of-sight component. If, however, the time-of-arrival of the first-arriving component is very close in time to the time of arrival of the next arriving multipath component, the geolocation system may not be able to distinguish between the two components, thereby causing the geolocation system to mistakenly determine that the time of arrival of the line-of-sight component is at some time between the time of arrival of the first-arriving component and the time-of-arrival of the next-arriving multipath component. When this happens, the geolocation system will incorrectly assume that the line-of-sight component arrived at a later time than it actually arrived. This so-called time-shift will thereby cause the geolocation system to incorrectly base the calculation of the geolocation of the wireless terminal on a time-of-arrival that is "time-shifted," and thus cause the geolocation to make an incorrect geolocation calculation.

In addition, if scattering prevents the actual line-of-sight component from reaching the receiving unit (e.g. a building blocks the line-of-sight path), then the first-arriving component of the received signal will not be the actual line-of-sight component but, rather, some later-arriving multipath component of the transmitted signal. When this happens, the geolocation system may incorrectly assess the time-of-arrival of the line-of-sight component as being received at a later point in time, i.e. time-shifted, thereby causing the geolocation system to inaccurately calculate the geolocation of the wireless terminal.

One device that uses conventional RF models to identify or test the effects of scattering in an RF environment is a ray-tracing tool. In general, a ray-tracing tool uses an RF model to predict the path or paths that an RF signal would travel in an RF environment. To make such a prediction, the ray-tracing tool must be programmed with a description of the RF environment. Once programmed, the ray-tracing tool generates an RF model of the RF environment and uses that RF model to make a trace of all the paths that the RF signal would travel if the signal had actually been transmitted from a particular location in the RF environment. That is, the ray-tracing tool generates a ray-trace by simulating the propagation of the RF signal using the RF model of the RF environment.

Since the desired output of the ray-tracing tool is a ray-trace that includes every path that the given RF signal would travel in the RF environment, obtaining such a desired output means that the ray-tracing tool must be able to accurately identify every point of reflection, or scattering, that exists in the RF environment. This requires that the RF model be programmed with an accurate description of the physical composition of the RF environment. The required physical description, or so-called environmental information, includes the location of buildings and/or other structures (e.g. trees, towers, etc.), the physical size of the structures, the composition of the structures (e.g. the types of materials), the density of structures, and the physical contour of the terrain (e.g. hills, valleys, etc.).

For any given RF environment, however, such environmental information can be voluminous and difficult to obtain. Thus, a programmer can spend many hours gathering environmental information and programming the RF model with the environmental information, while never being assured that the RF model is detailed enough to enable the ray-tracing tool to output an accurate ray-trace. In addition, given the constant change of many urban and suburban environments (e.g. the construction and demolition of buildings, the erection of communications towers and/or antennas, and the leveling of highly wooded areas), a fully-programmed conventional RF model is only useful for a limited time.

SUMMARY OF THE INVENTION

According to the principles of the present invention, an RF model of an RF environment is formed without programming a mathematical simulation with a physical description of the RF environment. Instead, an RF model of the RF environment is formed by determining a set of parameters that provide a measure of the number of multipaths an RF signal would incur if the RF signal were to propagate in the RF environment. By providing a measure of the multipaths, the parameters characterize the scattering hostility in the RF environment, and thus provide an RF model of the scattering hostility of the RF environment, or an RF model of the RF environment.

The term parameter as used herein refers to any parameter or so-called dimension that is capable of defining or describing a chaotic process or system (e.g. scattering) in terms of a measure of some aspect of that system. For example, a factual dimension is a parameter that can be used to define a chaotic system, such as a mountainous landscape, in terms of its self-similarity. The term self-similarity as used herein refers the presence of and/or the number of times a particular shape or pattern repeats itself in the chaotic system. Thus, a factual dimension that defines a mountainous landscape actually provides a measure of the number of times a particular shape is repeated in the shape of the landscape itself.

Just like a factual dimension can be used as a parameter to characterize a chaotic system such as the shape of a mountainous landscape, so can a factual dimension be used as a parameter to characterize a chaotic system such as an RF environment. In particular, the factual dimension can be used to characterize the scattering hostility of the RF environment by providing a measure of the number of times a similar shape (i.e. the various multipath components of the incoming signal) is repeated in the waveform of the incoming signal that traveled in the RF environment. By providing a measure of the number of multipath components of the incoming signal, the factual dimension actually provides a measure or characterization of the scattering hostility of the RF environment. Thus, according to the principles of the present invention, a set of such factual dimensions forms an RF model of the RF environment.

Advantageously, an RF model formed according to the principles of the present invention provides a tool that can be used to help test the design of a wireless communication system. For example, the RF model can be used to predict whether a given RF signal could be received (i.e. detected and decoded) by a wireless terminal communicating in a wireless communication system. In particular, such an RF model can be used to predict whether the scattering hostility of the RF environment was such that a signal traveling through the RF environment would be scattered to the point that the receiver would not be able to detect and/or decode the transmitted signal.

In addition, an RF model formed according to the principles of the present invention can advantageously be used to increase the accuracy of a geolocation system's determination of the geolocation of a wireless terminal communicating in an RF environment. For example, a set of parameters can be used to adjust an identified time-of-arrival of the line-of-sight component of an incoming signal to reduce any "time shift" in the identified time-of-arrival caused by scattering in the RF environment. The resultant "adjusted" time-of-arrival more accurately reflects the time at which the line-of-sight component would have arrived at the receiver if the RF environment were scatter-free.

In particular embodiments, the determination of the geolocation of a wireless terminal may be advantageously carried-out using the methods disclosed in my co-pending application Ser. No. 08/985,133, entitled "Detecting The Geolocation Of Wireless Units," filed on even date herewith.

In addition, in particular embodiments, the determination of the time-of-arrival of the line-of-sight component of an incoming signal may be advantageously carried-out using the methods disclosed in my co-pending application Ser. No. 08/984728, entitled "Method For Improved Line Of Sight Signal Detection Using Time/Frequency Analysis," filed on even date herewith.

Also, in particular embodiments, an identified time-of-arrival of the line-of-sight component of the incoming signal can be adjusted using the methods disclosed in my co-pending application, Ser. No. 08/984780, entitled "Method For Improved Line-Of-Sight Signal Detection Using RF Model Parameters," filed on even date herewith.

DETAILED DESCRIPTION OF ILLUSTRATIVE EMBODIMENTS OF THE INVENTION

Figure 1:
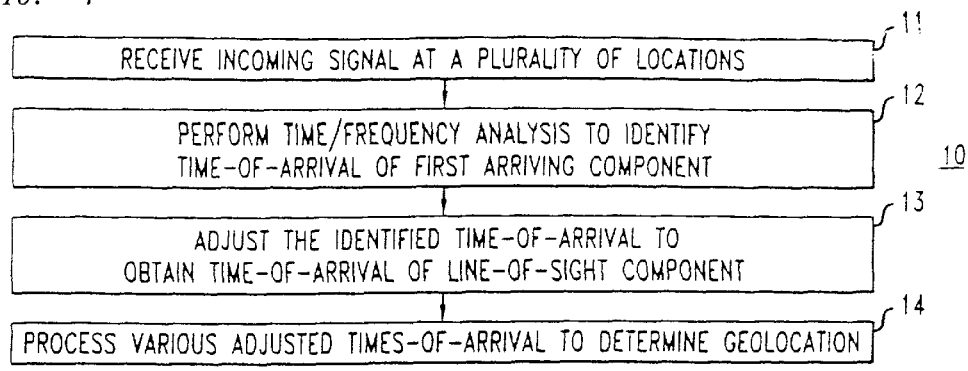
FIG. 1 is block diagram of an illustrative embodiment of a method for determining the geolocation of a wireless terminal.

Referring now to FIG. 1 there is shown a method 10 for determining the geolocation of a wireless terminal. As shown, method 10 begins with step 11 wherein a signal transmitted by the wireless terminal is received at a plurality of receiver locations. The signal received at each receiver location is referred to herein as the incoming signal. A time/frequency analysis is performed on each incoming signal, at step 12, to identify the time-of-arrival of the first-arriving multipath component of the respective incoming signal at each receiver location. The identified time-of-arrival of the first-arriving multipath component at each location is adjusted, at step 13, by an amount based on the value of at least one parameter of an RF model, in accordance with the principles of the present invention, that characterizes the scattering hostility of the RF environment in which the respective incoming signal traveled. The resultant "adjusted" time-of-arrival of the first-arriving component of each incoming signal more accurately reflects the time the line-of-sight component of the incoming signal would have reached the respective receiver locations if the RF environment were scatter-free. The various "adjusted" times-of-arrival are then processed, at step 14, to determine the geolocation of the wireless terminal.

In order to more fully explain the operation of method 10, the following topics will be addressed: (1) the incoming signal; (2) the line-of-sight and multipath components of the incoming signal; (3) the "time-shift" of the line-of-sight component of the incoming signal due to scattering; (4) time/frequency analysis of the incoming signal; (5) identifying the time-of-arrival of the line-of-sight component of the incoming signal; (6) using an RF model, formed in accordance with the principles of the present invention, to reduce a "time-shift" of the identified time-of-arrival of the line-of-sight component of the incoming signal, due to scattering; (7) determining parameters that form the RF model, in accordance with the principles of the present invention, used to reduce the time shift; and (8) using the time-of-arrival of the line-of-sight component of the incoming signal received at a plurality of locations to determine the geolocation of the wireless terminal.

The Incoming Signal

The incoming signal recited in method 10 can be any signal transmitted by the wireless terminal including those signals transmitted during regular communications. The term regular communications as used herein refers to the communications the wireless terminal regularly performs when in operation, for example, communications involving a call between the user of a cell phone and another party.

Line-of-Sight and Multipath Components

Figure 2:
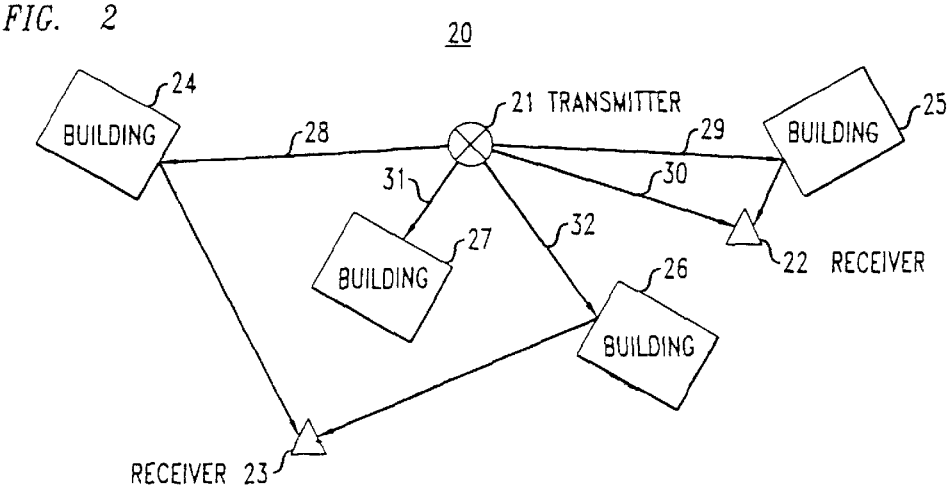
FIG. 2 is a top-view of the paths of the line-of-sight and multipath components of a signal traveling from a wireless terminal to a plurality of receiver locations in an RF environment.

As described above, the incoming signal may be composed of any number of multipath components of the transmitted signal, depending on the scattering hostility in the RF environment in which a signal travels. An illustration of the physical process by which various multipath components arrive at different receiver locations in an RF environment 20 is shown in FIG. 2. As shown, a wireless terminal 21, buildings 24–27 and receiver locations 22 and 23 are all located at different positions in RF environment 20. Depending on the position of wireless terminal 21 with respect to buildings 24–27 and receiver locations 22 and 23, a signal transmitted from wireless terminal 21 travels a plurality of paths 28–32 therefrom. Specifically, a signal transmitted from wireless terminal 21 travels to receiver location 22 along line-of-sight multipath, or line-of sight path, 30 and multipath 29, and to receiver location 23 along multipaths 28 and 32.

Time-Shift Due to Scattering

The incoming signal received at receiver location 22 has both a line-of-sight multipath component (i.e. the component that traveled along line-of-sight path 30) and a multipath component (i.e. the component that traveled along multipath 29). Since the multipath component travels a longer distance than the line-of-sight component, the time-of-arrival of the multipath component is later than the time-of-arrival of the line-of-sight component.

Figure 3:
FIG. 3 is a graphical view of the various components of an illustrative incoming signal received at a receiver location shown in FIG. 2.

Referring now to FIG. 3 there is shown a graphical view of the line-of sight component $S_{30}$ and the multipath component $S_{32}$ of an incoming signal received at receiver location 22, where the incoming signal is shown in FIG. 3 as signal 36. As shown, the line-of sight component $S_{30}$ of signal 36 has a time-of-arrival 34 and the multipath component $S_{32}$ of signal 36 has a time-of-arrival 35. As stated above, if time-of-arrival 34 and time-of-arrival 35 are very close in time, conventional geolocation devices that use matched filters to determine the time-of-arrival of the line-of-sight component may inaccurately determine that the line-of-sight component $S_{30}$ of incoming signal 36 arrived at time 31, which is Δt later than it actually arrived. When this happens, the identified time-of-arrival (i.e. time 31) of the line-of-sight component $S_{30}$ is said to be "time-shifted" by the time shift Δt due to scattering and/or multipathing in the RF environment.

The time shift Δt due to such close-arriving multipaths can be reduced by performing a time/frequency analysis on the incoming signal, as described below.

Referring now back to FIG. 2, the incoming signal received at receiver location 23 has two multipath components, i.e., the components that traveled along multipaths 28 and 32. However, it has no line-of-sight component because line-of-sight path 31 is blocked by building 27. Since such multipath components travel a farther distance in RF environment 20 than would the line-of-sight component if it had not been blocked by building 27, the time-of-arrival of each multipath component is therefore, by definition, later than the time at which the line-of-sight component would have arrived at receiver location 23.

Figure 4:
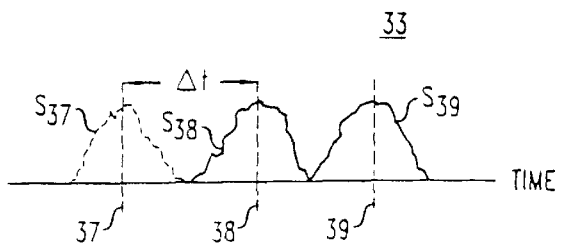
FIG. 4 is a graphical view of the various components of an illustrative incoming signal received at another receiver location shown in FIG. 2.

Referring now to FIG. 4 there is shown a graphical view of an incoming signal 33 received at receiver location 23. As shown, incoming signal 33 includes a multipath component $S_{38}$ that traveled along path 28, a multipath component $S_{39}$ that traveled along path 32, and an expected line-of-sight component $S_{37}$ that never reaches location 23 because it is blocked by building 27. The multipath components $S_{38}$ and $S_{39}$ are shown to have times-of-arrival 38 and 39, respectively, and line-of sight component $S_{37}$ is shown to have an expected time-of-arrival 37. Since a conventional geolocation system, as described above, would assume that the line-of-sight component of incoming signal 33 is the first-arriving component, such a geolocation system would incorrectly assume that the time-of-arrival of the line-of-sight component of incoming signal 33 is time 38, as opposed to time 37. When this happens, the geolocation system would incorrectly assume that the time-of-arrival of the line-of-sight component $S_{37}$ was a time-shift $\Delta t$, i.e. time difference between time 37 and time 38, later than it should have arrived. As described above, such a time-shift $\Delta t$ would reduce the accuracy of the geolocation system in determining the geolocation of wireless terminal 21.

The time shift $\Delta t$, due to such a blocked line-of-sight path, can be reduced by adjusting the identified time-of-arrival of the first-arriving component of the incoming signal by an amount based on a parameter that characterizes the scattering hostility of the RF environment in which the incoming signal traveled.

Time/Frequency Analysis

The term time/frequency analysis as used herein refers to an analysis of the frequency components of a signal (e.g. the magnitude of the waveform at each component frequency of the signal) at given instants in time. For example, one form of time/frequency analysis is to compare the frequency components of the incoming signal to the frequency components of the transmitted signal at given instants in time. (Although the exact nature of the transmitted signal is not typically known, its frequency components can indeed be known to a great extent since they are a function of the carrier frequency and the modulation used.) In such a time/frequency analysis, those instants in time in which the frequency components of the incoming signal match the frequency components of the transmitted signal are the instants in time at which a multipath component is received.

One illustrative method for performing a time/frequency analysis on the incoming signal is to perform a so-called wavelet analysis on the incoming signal. Wavelet analysis involves the act of breaking down a signal into a set of simpler elements, called wavelets. The wavelets are basically localized waveforms that last for only a few cycles. Thus, according to wavelet analysis, a wavelet representation of a signal is the set of wavelets that can be superposed to form the waveform of the signal.

Wavelet analysis can be explained by analogy to Fourier analysis. A Fourier transform represents a signal as a superposition of sinusoids with different frequencies, and the Fourier coefficients represent the contribution of the sinusoid at these frequencies. Similarly, a wavelet transform represents a signal as a sum of wavelets with different widths, called dilations, and amplitudes, called scalings, and the wavelet coefficients provide a measure of the contributions of each wavelet at these dilations and scalings.

Figure 5:
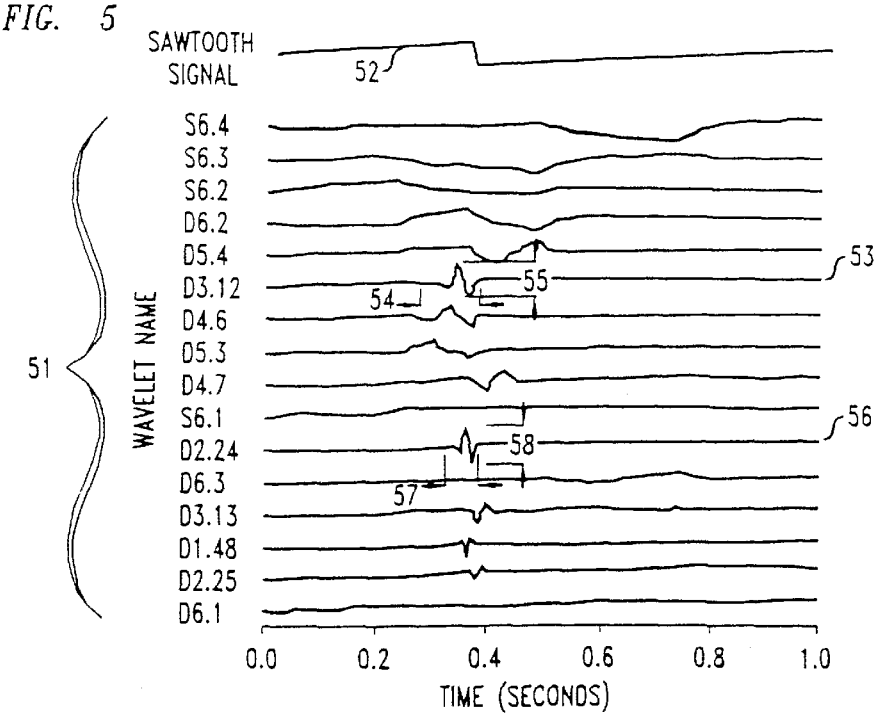
FIG. 5 is a graphical view of a wavelet representation of a sawtooth signal helpful in explaining how, in preferred embodiments, the above-described time shift is determined.

For example, referring now to FIG. 5 there is shown a sawtooth signal 52 that is represented by a family of wavelets, or wavelet representation, 51. As shown, wavelet representation 51 includes 16 different wavelets, each having a different dilation and scaling. For example, wavelet 53 has a dilation 54 and a scaling 55, and wavelet 56 has a dilation 57 and a scaling 58. Wavelet representation 51 is referred to as the wavelet transform of sawtooth signal 52, and sawtooth signal 52 is referred to as the inverse transform of the wavelet representation 51.

Both the wavelet transform and the inverse transform are arrived at according to known algorithms. For example, one illustrative algorithm used to compute both the wavelet transform and the inverse transform of a waveform is the fast pyramid algorithm described by A. Bruce, D. Donoho and H.Y.Goo, in "Wavelet Analysis," IEEE Spectrum, October 1996, and incorporated herein by reference. The fast pyramid algorithm provides a "forward algorithm" that serves to compute the wavelet transform, and a "backward algorithm" that serves to compute the inverse transform. The forward algorithm uses a series of linear filters to decompose a signal into a set of filtered components. It is the waveforms of these filtered components that form the wavelet representation of the signal. The reverse algorithm uses a set of linear filters to combine the wavelets comprising the wavelet representation to form the signal.

Figure 6:
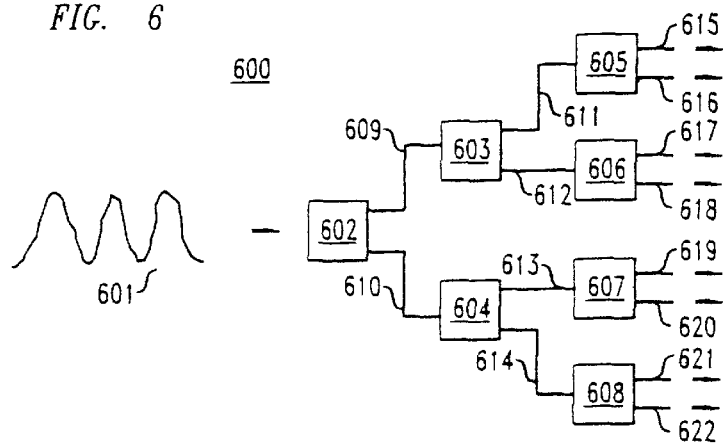
FIG. 6 is a block diagram of a set of linear filters that can be used to decompose an incoming signal into a set of frequency components in order to identify the time-of-arrival of a component of the incoming signal.

Referring now to FIG. 6 there is shown a block diagram of an illustrative set of linear filters 600 used to decompose a signal 601 into a set of filtered components 615–622. As shown, the set of linear filters 600 has a first-line filter 602 which is connected to second-line filters 603 and 604. Second line filter 603 is connected to third-line filters 605 and 606, and second-line filter 604 is connected to third-line filters 607 and 608.

In operation, signal 601 is input into first-line filter 602 which decomposes signal 601 into a high-frequency filtered component 609 and a low-frequency filtered component 610. Second-line filter 503 decomposes high-frequency component 609 into high frequency filtered components 611 and 612, and second-line filter 604 decomposes low frequency filtered component 610 into low-frequency filtered components 613 and 614. Third-line filter 605 decomposes high frequency filtered component 611 into high frequency filtered components 615 and 616. Third-line filter 606 decomposes high-frequency filtered component 612 into high frequency filtered components 617 and 618.

Third-line filter 607 decomposes low-frequency filtered component 613 into low frequency filtered components 619 and 620. Third-line filter 608 decomposes low-frequency filtered component 614 into low-frequency filtered components 621 and 622.

The waveforms of the set of filtered components 615–622 that result by inputting signal 601 into the set of linear filters 600 is shown. The waveforms of frequency components 615–622 are a set of waveforms that can be superposed to form signal 601. As a result, it is the waveforms of frequency components 615–622 that form a wavelet representation of signal 601. Alternatively, a different set of linear filters may be chosen to decompose signal 601 into a different set of frequency components that provide a different set of waveforms, or wavelets. Thus, it can be understood that different sets of linear filters can decompose signal 601 into different wavelet representations.

Identifying the Time-of-Arrival

Figure 7:
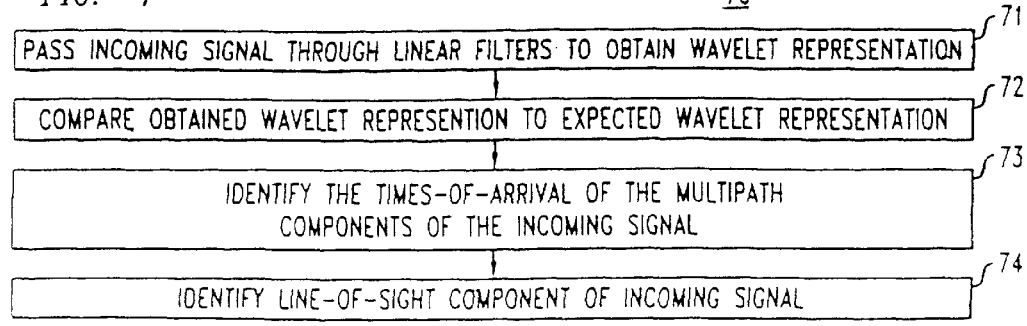
FIG. 7 is a block diagram of an illustrative embodiment of a method for using wavelet analysis as a form of time/frequency analysis to identify the line-of-sight component of an incoming signal.

The above-described time/frequency analysis can be used to identify the time-of-arrival of the line-of-sight component of an incoming signal. For example, wavelet analysis can be used as a time/frequency analysis to identify the time-of-arrival of the line-of sight component of an incoming signal. Referring now to FIG. 7 there is shown one illustrative embodiment of a method 70 for using wavelet analysis for identifying the time-of-arrival of the line-of-sight component of an incoming signal.

As shown, method 70 begins at step 71 wherein the incoming signal is passed through a set of linear filters to obtain a wavelet representation of the incoming signal. The wavelet representation of the incoming signal identified at each instant in time is then compared, at step 72, to a wavelet representation of a transmitted signal. As stated above, although the exact nature of the transmitted signal is not known, the waveform of its frequency components can indeed be known to a great extent since they are a function of the carrier frequency and the type of modulation used. Thus, since the wavelet representation of a signal is dependent on the waveform of its frequency components, the wavelet representation of the transmitted signal can be estimated with great accuracy.

The instants in time wherein the wavelet representation of the incoming signal is substantially similar to, or matches, the wavelet representation of the transmitted signal (called the expected wavelet representation) are identified, at step 73, as the times-of-arrival of the multipath components of the incoming signal. Since the line-of-sight component of the incoming signal travels the shortest distance, the first-arriving, or earliest, time-of-arrival is identified, at step 74, as the time-of-arrival of the line-of-sight component of the incoming signal. As stated above, determining the time-of-arrival of the line-of-sight component using such a time/frequency analysis, reduces the inaccuracies associated with using a matched filter. Thus, method 70 increases the accuracy of the identified time-of-arrival of the line-of-sight component of the incoming signal over the prior art methods that utilize such a so-called matched filter method.

Figure 8:
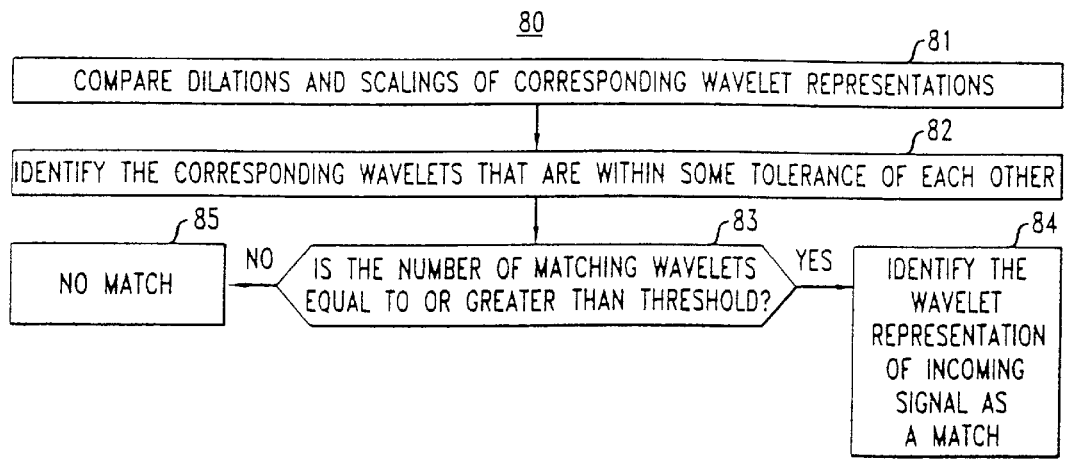
FIG. 8 is block diagram of an illustrative embodiment of a method for determining whether a wavelet representation of an incoming signal matches a wavelet representation of a transmitted signal.

An illustrative embodiment of a method 80 for determining whether the wavelet representation of the incoming signal matches the expected wavelet representation of the transmitted signal is shown in FIG. 8. As, shown, method 80 begins at step 81 wherein the dilations and scalings of the wavelets which represent the incoming signal are compared to the dilations and scalings of the "corresponding wavelets" which represent the transmitted signal. The term "corresponding wavelets" as used herein refers to the wavelet of the incoming signal and the wavelet of the transmitted signal that represent the waveform of the frequency band of its respective signal. At step 82, the corresponding wavelets that have dilations and scalings that are within some tolerance of each other are identified, and labeled as matching wavelets. The number of matching wavelets is then compared to a threshold number, at step 83. If the number of matching wavelets is equal to or greater than the threshold number then, at step 84, the wavelet representation of the incoming signal is said to match the wavelet representation of the transmitted signal. If, however, the number of matching wavelets is less than the threshold number then, at step 85, the wavelet representation of the incoming signal is said to not match the wavelet representation of the transmitted signal. As stated above, each instant at which a match is identified can there for be identified as a time-of-arrival of a multipath component of the incoming signal.

Using an RF Model to Adjust an Identified Time-of-Arrival

As described above and shown in FIG.'s 2 and 4, the identified time-of-arrival of the line-of-sight component of the incoming signal can be "time-shifted" when the line-of-sight component is blocked (i.e. prevented from arriving at the receiver location).

The present inventor has found that the amount of time-shift due to such a blocked line-of-sight path directly depends on the scattering hostility of the RF environment in which the incoming signal traveled. In particular, the present inventor has found that the amount of time-shift due to such a blocked line-of-sight path can be reduced by adjusting the identified time-of arrival of the first-arriving component of the incoming signal by an amount based on a parameter, in accordance with the principles of the present invention, that characterizes the scattering hostility of the RF environment in which the incoming signal traveled.

Figure 9:
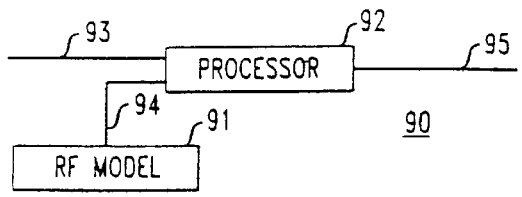
FIG. 9 is a block diagram of an illustrative embodiment of an apparatus for adjusting the identified time-of-arrival of an incoming signal.

Referring now to FIG. 9 there is shown one illustrative embodiment of a device 90 for adjusting the identified time-of-arrival of the line-of-sight component of an incoming signal. As shown, device 90 has An RF model 91 connected to a processor 92. RF model 91 has a set of parameters, each parameter characterizing the scattering hostility of a given region of an RF environment. Processor 92 has inputs 93 and 94, and output 95.

In operation, processor 92 obtains, at input 93, the time-of-arrival identified for the first-arriving component of an incoming signal that traveled through a given region of an RF environment. Processor 92 obtains, at input 94, a parameter that characterizes the scattering hostility in the given region of the RF environment, from RF model 91. The given region through which the incoming signal traveled is determined by identifying the direction from which the incoming signal traveled and/or the strength of the incoming signal. The methods by which such signal direction and signal strength are determined are well known in the art. Based on the obtained parameter, processor 92 determines the amount of time-shift of the obtained time-of-arrival that is due to scattering and/or multipath in the RF environment. Then, based on the time-shift information, processor 92 computes and outputs from output 95 an adjusted time-of-arrival that more accurately reflects the time at which the line-of-sight component would have arrived in a scatter-free environment.

As stated above, each parameter in accordance with the principles of the present invention is a measure of the amount of multipathing, and the amount of "time-shift" that a given signal would incur in a given region of the RF environment. As a result, each parameter of RF model 91 indicates the relative amount of "time-shift" that would occur if a signal were to travel in the respective region. It can therefore be understood that a parameter of RF model 91 that characterizes a given region as having a greater scattering hostility than another region, necessarily indicates that the amount of "time-shift" that would occur if the incoming signal were to travel in that given region is greater than the amount of time shift that would occur in the other region.

Processor 92 can determine the amount of such a time shift that would occur in a given region by comparing the value of a parameter that characterizes the scattering hostility of the given region, in accordance with the principles of the present invention, to the value of a basis parameter. The term basis parameter as used herein refers to a parameter that characterizes the scattering hostility in a given region wherein the amount of time-shift that results when a signal travels in that given region is known. Thus, a basis parameter is a parameter that has a known associated time-shift.

Figure 10:
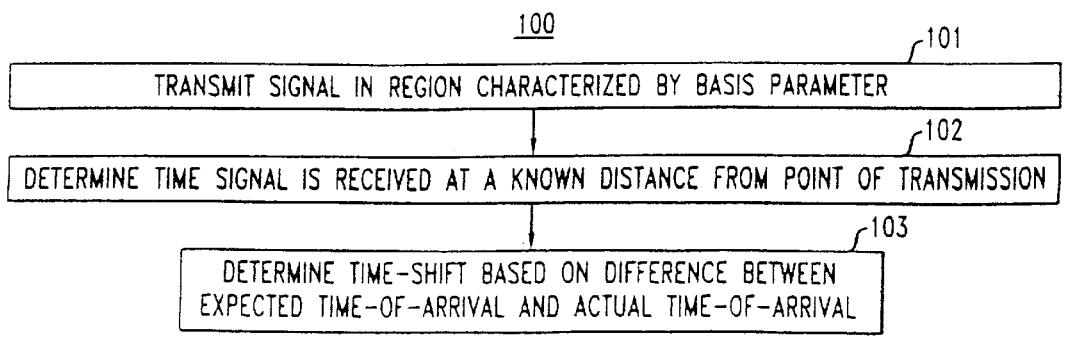
FIG. 10 is a block diagram of an illustrative embodiment of a method for determining a basis parameter used to adjust an identified time-of-arrival of an incoming signal.

Referring now to FIG. 10, there is shown an illustrative embodiment of a method 100 for determining a basis parameter in accordance with the principles of the present invention. As shown, method 100 begins at step 101 wherein a signal is transmitted in a region characterized by the basis parameter. The time at which the signal is received at a known distance from the wireless terminal is determined at step 102. The difference between the actual time-of-flight (the time it took for the first-arriving component of the signal to actually travel the given distance) and the expected time-of-flight (i.e. the time the signal would have traveled the given distance along the line-of-sight path) is determined at step 103. The calculated difference is thereby the known time-shift associated with the basis parameter.

Referring now back to FIG. 9, processor 92 determines the amount of time shift of the time-of-arrival obtained at input 93 by comparing the parameter obtained at input 94 to a so-called basis parameter, and adjusting the value of the known time-shift associated with the basis parameter by an amount based on the difference between the value of the basis parameter and the value of the given parameter. For example, the known time-shift associated with the basis parameter can be adjusted in direct proportion to the difference between the value of the basis parameter and the value of the given parameter. The resultant adjusted time shift is the time shift of the identified time-of arrival of the first arriving component of the incoming signal, due to such a line-of-sight path, as described above. Processor 92 can then adjust the identified time of arrival, obtained at input 93, by the time-shift, and output the adjusted time-of-arrival through output 95.

Determining the Parameters

The term parameter as used herein, and in accordance with the principles of the present invention, refers to any parameter or so-called dimension that is capable of defining or describing a chaotic process or system in terms of a measure of some aspect of that system. One type of parameter or dimension that can be used to define such a chaotic process is a factual dimension. Factual dimensions are described by A. P. Pentland in "Factual-Based Description of Natural Scenes," IEEE Transactions on Pattern Analysis and Machine Intelligence, Vol. PAMI-6, No. 6, November 1984, and incorporated herein by reference.

As noted above, a factual dimension is a parameter that defines a chaotic system by characterizing the system in terms of a measure of so-called self-similarity. For example, a factual dimension has been used to define the shape of a mountainous landscape by characterizing the amount of self-similarity that exists in the shape of the landscape. The amount of self-similarity in the shape of the landscape is the number of times a particular shape is repeated in the shape of the landscape itself. The particular shape is the largest shape found in the actual landscape that can be used to define or re-create each piece of the actual landscape. As a result, the factual dimension determined for any given landscape provides a measure of the size of the particular repeated shape with respect to the size of the landscape itself, and thus a characterization of the landscape itself Just like a factual dimension can be used as parameter to characterize the a chaotic system such as a mountainous landscape, so can a factual dimension be used as a parameter to characterize a chaotic system such as an RF environment. In particular, a factual dimension can be used to characterize the scattering hostility of an RF environment by providing a measure of the number of times a similar shape (i.e. the various multipath components of the incoming signal) is repeated in the waveform of the incoming signal that traveled in the RF environment. By providing a measure of the number of multipath components of the incoming signal, the factual dimension actually provides a measure or characterization of the scattering hostility of the RF environment. Thus, a set of such factual dimensions forms an RF model of the RF environment.

Figure 11:
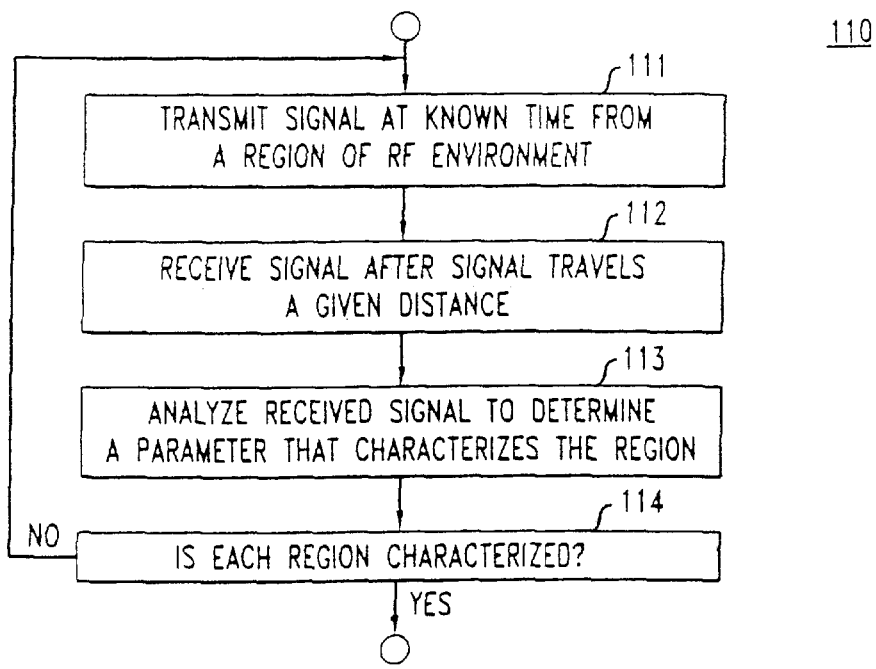
FIG. 11 is a block diagram of an illustrative embodiment of a method for forming an RF model of an RF environment, in accordance with the principles of the present invention.

Referring now to FIG. 11 there is shown an illustrative method 110 for forming such an RF model of an RF environment, in accordance with the principles of the present invention. As shown, method 110 begins at step 111 wherein an RF signal having a given waveform is transmitted at a known time from a given region of an RF environment. The RF signal, after traveling a given distance in the given region of the RF environment is received, step 112. The received signal, or so-called incoming signal, is analyzed, step 113, to determine a parameter that characterizes the scattering hostility of that region of the RF environment. Then: at decision step 114, method 110 checks whether a parameter has been determined for each region of the RF environment. If such a parameter has been determined for each region, method 110 ends, otherwise steps 111–113 are repeated until such time that each region has a parameter determined there for.

It should be understood that, in accordance with the principles of the present invention, no region of the RF environment is limited to being characterized by one such parameter. Rather each region can be characterized, for example, by a plurality of parameters, or a single parameter that is an average of a plurality of parameters. In addition an RF environment is not limited to a specific number of regions. The RF environment, for example, can be a single region or one hundred regions.

Moreover, each parameter of a given RF model, in accordance with the principles of the present invention, is not limited to characterizing a region of any particular size. For example, a given RF model can be compose of a set of parameters wherein each parameter characterizes the scattering hostility in a region having the same size and shape as every other region. Or, for example, each parameter can characterize a region having an arbitrary size and shape. Or, for example, each parameter characterizes a region having size and shape based on some criterion such as the physical profile (i.e. rural, urban, suburban, etc.) of the region.

In addition, a set of such parameters that characterize any given region, in accordance with the principles of the present invention, can be determined as a function of time. That is, each determined parameter may be a time-varying function of the scattering hostility of a given region of the RF environment.

Advantageously, a set of such parameters can be used as an RF model of the RF environment to aid in the design of a wireless communication system. For example, since each parameter defines the amount of multipath that a given signal would incur if the signal were to travel in a region of the RF environment, each parameter can be used to predict the amount a signal would multipath if the signal were to propagate in that respective region. Based on the prediction, a system designer could estimate the amount the waveform of the RF signal would change shape as a result of traveling in the given region, and thus could determine whether a given receiver would be capable of detecting and/or recognizing the transmitted signal after traveling in the RF environment. Such information, as described above, may be critical in testing the design of a wireless system before incurring the cost of building the system itself.

In addition, a set of such parameters can advantageously be used to adjust the identified time of arrival of the line-of-sight component of the incoming signals received at a plurality of locations in an RF environment, and thus provide a geolocation system with more-accurate time-of-arrival information for determining the geolocation of a wireless terminal operating in the RF environment.

Determining the Geolocation of a Wireless Terminal

Figure 12:
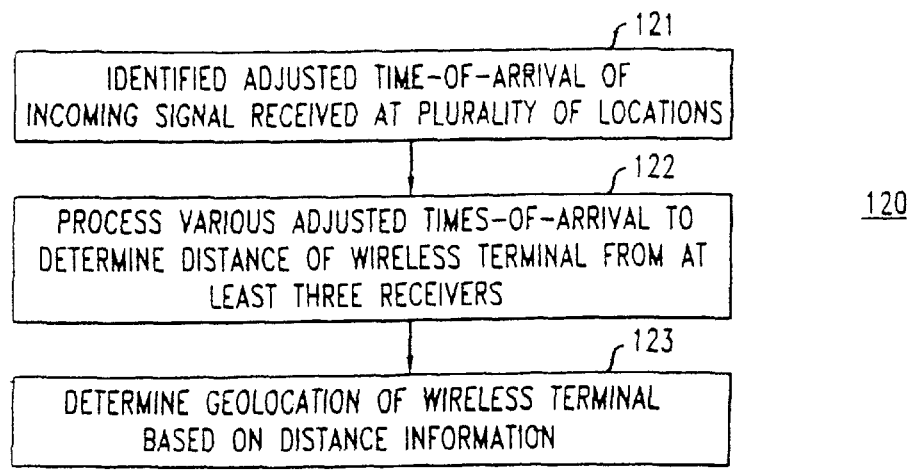
FIG. 12 is a block diagram of an illustrative embodiment of a method for determining the geolocation of a wireless terminal based on adjusted times-of-arrival.

Referring now to FIG. 12, there is shown a method 120 for determining the geolocation of a wireless terminal. As shown, method 120 begins at step 121 wherein the adjusted time-of-arrival of the line-of-sight component is identified for the incoming signal received at a plurality of receiver locations. Then, step 122, the various times-of-arrival are processed to determine the distance of the wireless terminal from at least three receiver locations. From this distance information, the geolocation of the wireless terminal is identified, step 123.

The processing performed to determine the geolocation of a wireless terminal, based on the time-of-arrival of the line-of-sight component of the incoming signal received at the at least three receiver locations, is well-known in the art. For example, one illustrative method for using such times-of-arrival information to determining the geolocation of a vehicle is disclosed by J. Brooks Chadwick and J. L. Bricker in "A Vehicle Location Solution Approach," IEEE Position Location and Navigation Symposium, 1990, and incorporated herein by reference.

It should be noted that using an adjusted time-of-arrival of the line-of-sight component of the various incoming signals, as computed above, increases the accuracy of the just-described processing for determining the geolocation of the wireless terminal. This is due to the direct dependence of the accuracy of the geolocation calculation on the accuracy of time-of-arrival of the line-of-sight component of the incoming signal. Advantageously, determining the geolocation of a wireless unit as described above, does not require the consumption of additional bandwidth, or the increased in cost associated with adding hardware to the wireless terminal, as in some of the prior art solutions.

While the invention has been particularly shown and described with reference to various embodiments, it will be recognized by those skilled in the art that modifications and changes may be made to the present invention without departing from the spirit and scope thereof As a result, the invention in its broader aspects is not limited to specific details shown and described herein. Various modifications may be made without departing from the spirit or scope of the general inventive concept as defined by the appended claims.

I claim:

1. A method for determining the scattering characteristics of a radio frequency environment, comprising the steps of:

producing a wavelet representation of an incoming signal; and comparing the wavelet representation of the incoming signal with an expected wavelet representation of the incoming signal to produce a measure of the number of multipath components in the incoming signal.

2. The method of claim 1, wherein the step of producing the wavelet representation of the incoming signal comprises passing the incoming signal through at least one filter.

3. The method of claim 2, wherein the incoming signal is passed through at least one linear filter.

4. The method of claim 2, wherein the incoming signal is passed through a series of linear filters.

5. The method of claim 1, wherein the step of comparing comprises determining whether corresponding wavelets in the wavelet representation of the incoming signal and the expected wavelet representation of the incoming signal match.

6. The method of claim 5, wherein the step of comparing comprises comparing a number of matching corresponding wavelets to a threshold.

7. The method of claim 5, wherein the step of determining whether corresponding wavelets match comprises determining whether dilations of corresponding wavelets are within a predetermined tolerance.

8. The method of claim 7, wherein the step of comparing comprises comparing a number of matching corresponding wavelets to a threshold.

9. The method of claim 5, wherein the step of determining whether corresponding wavelets match comprises determining whether scalings of corresponding wavelets are within a predetermined tolerance.

10. The method of claim 5, wherein the step of comparing comprises comparing a number of matching corresponding wavelets to a threshold.

* * * * *